United States Patent
Lueck

(10) Patent No.: US 7,745,950 B2
(45) Date of Patent: Jun. 29, 2010

(54) GENERATOR-STARTER SYSTEM FOR A MULTI-SHAFT ENGINE

(75) Inventor: Rudolf Lueck, Rehbrücke (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 390 days.

(21) Appl. No.: 11/896,507

(22) Filed: Sep. 4, 2007

(65) Prior Publication Data
US 2008/0054644 A1   Mar. 6, 2008

(30) Foreign Application Priority Data
Sep. 1, 2006   (DE)   ............ 10 2006 041 325

(51) Int. Cl.
*F02C 7/26*   (2006.01)
*H02K 7/00*   (2006.01)

(52) U.S. Cl. ............... 290/52; 60/791; 310/58
(58) Field of Classification Search ........ 290/1 A, 290/7, 52, 1 R, 6, 40 A, 54; 60/791, 788; 310/58
See application file for complete search history.

(56) References Cited

U.S. PATENT DOCUMENTS

| | | | |
|---|---|---|---|
| 2,949,731 A | 8/1960 | Hambling | |
| 4,737,709 A | 4/1988 | Loftus | |
| 5,376,827 A | 12/1994 | Hines | |
| 5,607,329 A | 3/1997 | Cho | |
| 7,513,120 B2 * | 4/2009 | Kupratis | 60/791 |
| 2002/0122723 A1 | 9/2002 | Care et al. | |
| 2004/0011018 A1 | 1/2004 | Bouiller et al. | |
| 2007/0169462 A1 | 7/2007 | Sharp et al. | |
| 2007/0277532 A1 * | 12/2007 | Talan | 60/792 |
| 2008/0054739 A1 * | 3/2008 | Lueck | 310/58 |

FOREIGN PATENT DOCUMENTS

| | | |
|---|---|---|
| DE | 10 62 986 A | 8/1959 |
| DE | 12 68 437 A | 5/1968 |
| DE | 36 29 013 A1 | 4/1987 |
| GB | 2409936 | 7/2005 |
| WO | WO 2005/0 60 381 A2 | 7/2005 |
| WO | 2005073519 | 8/2005 |

OTHER PUBLICATIONS

European Search Report dated Mar. 5, 2010 from corresponding patent application.

* cited by examiner

*Primary Examiner*—Nicholas Ponomarenko
(74) *Attorney, Agent, or Firm*—Timothy J. Kilma; Shuttleworth & Ingersoll, PLC

(57) ABSTRACT

In order to provide a high electric power for an aircraft via a generator driven by the engine, an additional free turbine is included in the hot-gas flow of the engine, which—equipped with generator-starter magnets (9) and surrounded by annularly arranged generator-starter coils (12)—forms a generator-starter turbine (5) and is connected to the high-pressure shaft (1) via an overrunning clutch (15), and hence, is also used for starting the engine.

17 Claims, 1 Drawing Sheet

GENERATOR-STARTER SYSTEM FOR A MULTI-SHAFT ENGINE

CROSS-REFERENCE TO RELATED APPLICATIONS

This application claims priority to German Patent Application DE 10 2006 041 325.3 filed Sep. 1, 2006, the entirety of which is incorporated by reference herein.

BACKGROUND OF THE INVENTION

The present invention relates to a generator-starter system for a multi-shaft engine with a generator coupled to the high-pressure shaft of the high-pressure turbine for taking off a high electric power and for starting the engine.

Secondary electric power, as is generally known, is today pneumatically taken off the engine. If the electrical power demand of the aircraft is high, such a generator-starter arrangement is, however, disadvantageous in that the compressor encounters stability problems when power take-off is very high and the higher weight resulting from the increased performance of the generator, which also acts as motor during engine start, affects the distribution of weight on the engine. Therefore, the electric power supply is limited.

Further known is the off-take of the required electric power by way of a generator connected to the low-pressure shaft, an arrangement which, however, necessitates a complex gearbox since the speed of the low-pressure shaft is variable. Furthermore, the generator, which is connected to the low-pressure shaft, cannot be used as starter for the engine, and a clutch, which would in this arrangement be required between the high-pressure and the low-pressure shaft, is complex and increases weight.

Finally, the use of so-called "embedded" generators was proposed which, however, are badly accessible and, therefore, entail considerable maintenance and repair effort.

BRIEF SUMMARY OF THE INVENTION

The present invention, in a broad aspect, provides for a generator-starter system coupled to the high-pressure shaft of a multi-shaft engine which, according to the respective requirements, enables a high power take-off and, while avoiding problems regarding weight, center of gravity shifting and stability, is easily maintainable and repairable.

The idea of the present invention is that an additional, free turbine is arranged downstream of the high-pressure turbine, whose blade tips are equipped with magnets and enclosed by a stator formed by annularly disposed electric coils. Thus, a centrally arranged generator-starter turbine driven by the hot-gas flow of the engine is provided which enables a high power off-take for the aircraft and, while causing neither stability nor weight distribution problems, is easily accessible and, thus, easily maintainable and repairable. Additionally, an overrunning clutch connected axially to the high-pressure shaft enables the generator-starter turbine, with low investment, to be used for starting the engine. Guide vanes arranged upstream of the generator-starter turbine or incidence-variable turbine blades enable the speed of the generator-starter turbine to be controlled so that a constant speed and, thus, a constant voltage can be set, independently of changes in the hot-gas volume flow.

In accordance with another feature of the present invention, the actual generator or starter, respectively, is situated in a bypass duct separated from the airflow in the hot-gas duct and is cooled by the cooler air flowing in the bypass duct. The generator-starter magnets protrude through a thermal seal into an annular chamber which is provided on the outer periphery of the hot-gas duct and is cooled by the air flowing in the bypass duct via cooling fins.

BRIEF DESCRIPTION OF THE DRAWINGS

The present invention is more fully described in light of the accompanying drawing showing a preferred embodiment.

DETAILED DESCRIPTION OF THE INVENTION

Figure 1:
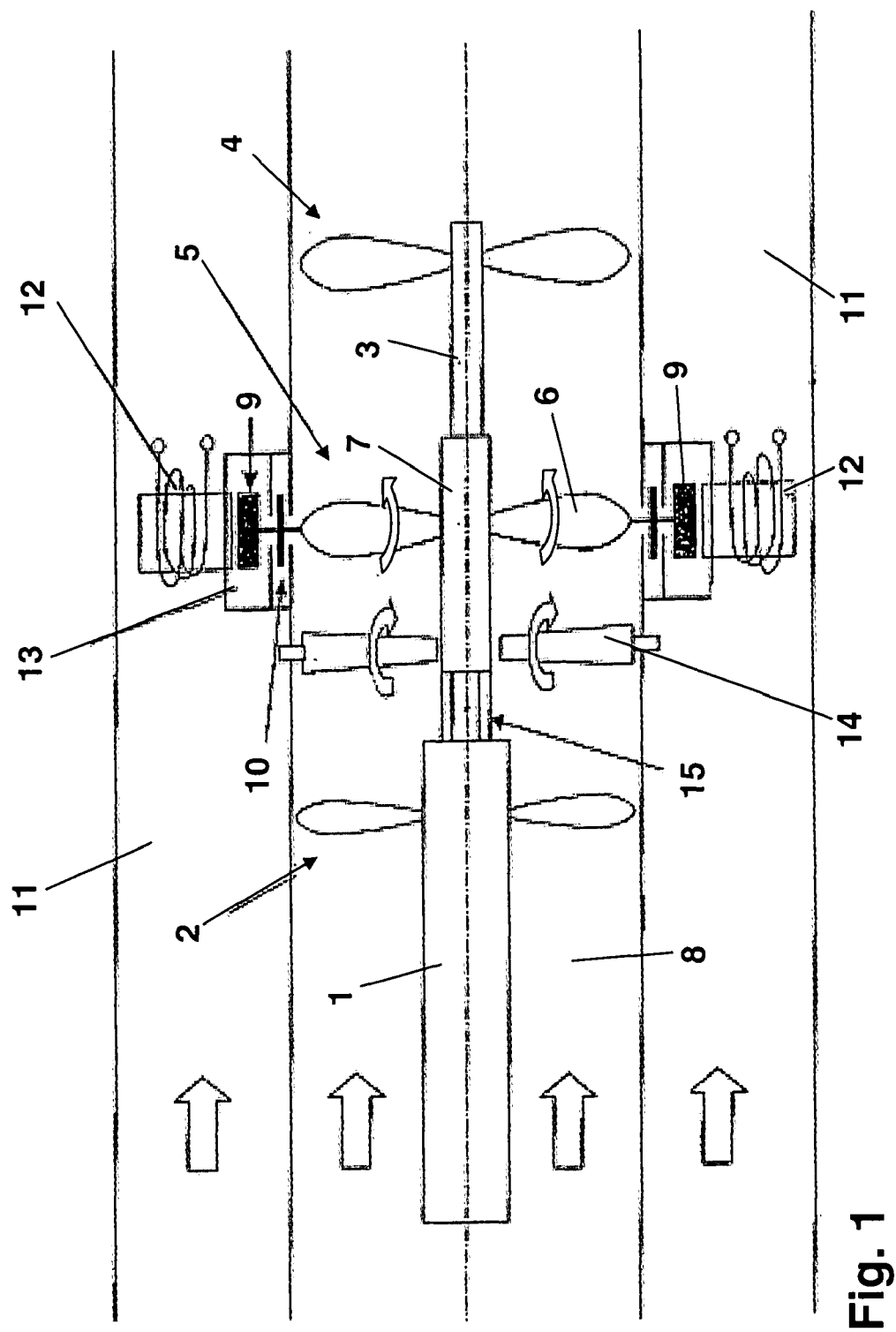
FIG. 1 schematically shows in simplified representation a partial sectional view of a generator-starter system arranged between the high-pressure turbine and the low-pressure turbine.

As shown in the drawing, a further turbine, designated as generator-starter turbine 5, is arranged between the high-pressure turbine 2 connected to the high-pressure shaft 1 and the low-pressure turbine 4 connected to the low-pressure shaft 3. The generator-starter turbine 5 comprises turbine blades 6 which are arranged on the periphery of an additional—axially arranged, short—intermediate shaft 7 and are flown, and rotated, by propulsion air in the hot-gas duct 8 of the engine. Attached to the tips of the turbine blades 6 are generator-starter magnets 9 (permanent magnets or electromagnets) which—thermally isolated from the hot-gas duct 8—protrude via a seal 10 into the bypass duct 11 of the engine. The turbine blades 6 with the generator-starter magnets 9 fitted to them form a generator-starter rotor which is remotely enclosed by a generator-starter stator having a multitude of circumferentially arranged generator-starter coils 12 of which each is selectively connected to a power source. The generator-starter magnets 9 rotate within an annular chamber 13 which is situated on the outer periphery of the hot-gas duct 8 and is isolated from the hot propulsion airflow by a thermal seal 10. The thermal seal 10 avoids heat convection flow from the hot-gas duct 8 into the annular chamber 13, so that only pressure compensation, but no heat exchange can occur. The annular chamber 13, which on its outer side can be provided with cooling fins, and also the generator-starter coils 12, are cooled by the cooler airflow passing through the bypass duct 11.

As the generator-starter rotor is rotated by the propulsion airflow, a voltage is produced in the generator-starter coils 12 and the system acts as generator for providing the required electric power. The speed of the generator-starter rotor, and thus the generator output, depends on the respective air mass flow and is controlled by variation of the variably borne turbine blades 6 and/or by variable guide vanes 14 disposed upstream of the generator-starter turbine 5, i.e. it is adapted to the air mass flow. The respective incidence of the guide vanes 14 and/or the turbine blades 6 enables the speed of the generator-starter turbine, and thus the voltage produced, to be held constant.

For starting the engine, the generator-starter turbine is operated as a motor (starter) by applying a voltage to the generator-starter coils 12. For this purpose, the intermediate shaft 7 is connected to the high-pressure shaft 1 via an overrunning clutch 15. Upon engine start, the connection between the high-pressure shaft 1 and the intermediate shaft 7 of the generator-starter turbine 5 is automatically separated at a certain speed and the generator-starter turbine 5, upon disconnection of the generator-starter coils 12 from the power source, is operated as generator of electric power for the aircraft.

The generator, which is driven by the engine gas flow and is load-controlled via variable guide vanes and/or turbine blades, is capable of supplying the required high electric power for the aircraft at constant voltage and is also used as a starter for the engine via the connection to the high-pressure shaft provided by the overrunning clutch. Problems of stability or weight distribution on the engine do not occur. The generator is thermally isolated towards the hot-gas flow and appropriately cooled by the bypass air, and is also easily accessible for maintenance and repair so that a long service life is ensured.

LIST OF REFERENCE NUMERALS

1 High-pressure shaft
2 High-pressure turbine
3 Low-pressure shaft
4 Low-pressure turbine
5 Generator-starter turbine
6 Turbine blades
7 Intermediate shaft
8 Hot-gas duct
9 Generator-starter magnets
10 Thermal seal
11 Bypass duct
12 Generator-starter coils
13 Annular chamber
14 Variable guide vanes
15 Overrunning clutch

What is claimed is:

1. A generator-starter system for a multi-shaft engine, comprising:
    a generator-starter coupled to a high-pressure shaft of a high-pressure turbine of the engine for generating electric power and for starting the engine, the generator-starter comprising:
        a free generator-starter turbine arranged in a hot-gas duct of the engine downstream of the high-pressure turbine, the free generator-starter turbine including a plurality of generator-starter magnets positioned around a periphery thereof to form a generator-starter rotor;
        a generator-starter stator positioned adjacent the generator-starter magnets;
        an overrunning clutch axially connecting the free generator-starter turbine to the high-pressure shaft;
        at least one of variable guide vanes positioned upstream of the generator-starter turbine and variable turbine blades positioned on the free generator-starter turbine, the at least one of variable guide vanes and variable turbine blades constructed and arranged to control a rotational speed of the free generator-starter turbine to control electrical output from the generator-starter.

2. A generator-starter system in accordance with claim 1, wherein the generator-starter magnets and the generator-starter stator are positioned in a bypass duct of the engine, separated from a hot-gas duct of the engine, and flown by cooling air.

3. A generator-starter system in accordance with claim 2, wherein the generator-starter magnets are attached to tips of the variable turbine blades and the generator-starter stator includes a plurality of generator-starter coils positioned around a circumference of the generator-starter stator.

4. A generator-starter system in accordance with claim 3, and further comprising both variable guide vanes positioned upstream of the generator-starter turbine and variable turbine blades positioned on the free generator-starter turbine.

5. A generator-starter system in accordance with claim 4, and further comprising:
    an annular chamber in which the generator-starter magnets are positioned and rotate; and
    a thermal seal separating the annular chamber from a hot-gas flow in the hot-gas duct.

6. A generator-starter system in accordance with claim 5, and further comprising cooling fins provided on the annular chamber.

7. A generator-starter system in accordance with claim 6, wherein the generator-starter magnets are permanent magnets.

8. A generator-starter system in accordance with claim 6, wherein the generator-starter magnets are electromagnets.

9. A generator-starter system in accordance with claim 1, and further comprising:
    an annular chamber in which the generator-starter magnets are positioned and rotate; and
    a thermal seal separating the annular chamber from a hot-gas flow in the hot-gas duct.

10. A generator-starter system in accordance with claim 9, and further comprising cooling fins provided on the annular chamber.

11. A generator-starter system in accordance with claim 10, wherein the generator-starter magnets are permanent magnets.

12. A generator-starter system in accordance with claim 10, wherein the generator-starter magnets are electromagnets.

13. A generator-starter system in accordance with claim 1, wherein the generator-starter magnets are attached to tips of the variable turbine blades and the generator-starter stator includes a plurality of generator-starter coils positioned around a circumference of the generator-starter stator.

14. A generator-starter system in accordance with claim 13, and further comprising both variable guide vanes positioned upstream of the generator-starter turbine and variable turbine blades positioned on the free generator-starter turbine.

15. A generator-starter system in accordance with claim 1, and further comprising both variable guide vanes positioned upstream of the generator-starter turbine and variable turbine blades positioned on the free generator-starter turbine.

16. A generator-starter system in accordance with claim 1, wherein the generator-starter magnets are permanent magnets.

17. A generator-starter system in accordance with claim 1, wherein the generator-starter magnets are electromagnets.

* * * * *